US006421151B1

United States Patent
Berger et al.

(10) Patent No.: US 6,421,151 B1
(45) Date of Patent: *Jul. 16, 2002

(54) METHOD AND ARRANGEMENT FOR STABILIZING WAVELENGTH OF MULTI-CHANNEL OPTICAL TRANSMISSION SYSTEMS

(75) Inventors: Matthias Berger, Burgthann; Lothar Moeller, Aachen, both of (DE)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/131,861

(22) Filed: Aug. 10, 1998

(51) Int. Cl.[7] ................................................ H04J 14/02
(52) U.S. Cl. .................... 359/124; 359/133; 359/187
(58) Field of Search ................................ 359/124, 133, 359/187

(56) References Cited

U.S. PATENT DOCUMENTS

| | | | | | |
|---|---|---|---|---|---|
| 4,622,662 A | * | 11/1986 | Laude et al. | ..................... | 370/3 |
| 5,448,629 A | * | 9/1995 | Bosch et al. | ................. | 359/187 |
| 5,742,416 A | * | 4/1998 | Mizrahi | ........................ | 359/134 |
| 5,745,275 A | * | 4/1998 | Giles et al. | .................. | 359/167 |
| 5,909,297 A | * | 6/1999 | Ishikawa et al. | ............ | 359/161 |
| 5,917,633 A | * | 6/1999 | Gambini et al. | ............ | 359/158 |
| 5,920,414 A | * | 7/1999 | Mlyachi et al. | ............. | 359/133 |
| 5,946,119 A | * | 8/1999 | Bergano et al. | ............. | 359/124 |
| 6,031,647 A | * | 2/2000 | Roberts | ........................ | 359/161 |
| 6,043,915 A | * | 3/2000 | Giles et al. | .................. | 359/132 |
| 6,134,034 A | * | 10/2000 | Terahara | ..................... | 359/124 |
| 6,204,945 B1 | * | 3/2001 | Iwata et al. | .................. | 359/124 |

\* cited by examiner

Primary Examiner—Leslie Pascal
Assistant Examiner—Hanh Phan
(74) Attorney, Agent, or Firm—Harness, Dickey & Pierce, P.L.C.

(57) ABSTRACT

The invention relates to a method and a device for wavelength stabilizing for multichannel optical transmission systems. An optical multiplexer is used directly for the generation of the optical total signal. This makes possible a simple electronic regulation of wavelengths of the optical carrier signals through analysis of the amplitude values of low-frequency signals, which modulate the optical carrier signals by means of amplitude modulation.

7 Claims, 1 Drawing Sheet

METHOD AND ARRANGEMENT FOR STABILIZING WAVELENGTH OF MULTI-CHANNEL OPTICAL TRANSMISSION SYSTEMS

BACKGROUND OF THE INVENTION

1. Field of the Invention

The present invention relates to optical transmission systems; more specifically, wavelength stabilization for multi-channel optical transmission systems.

2. Description of the Prior Art

In multichannel optical transmission systems (WDM-Systems) it is presently possible to discern a trend towards constantly higher numbers of channels. Since the optical fibers and amplifiers used for signal transmission have good transmission properties for optical signals only with a certain wavelength or located within a certain range of wavelengths, the channel separations between the individual carrier signals diminish to the extent that the number of channels increases. The reduction of channel separations results in higher requirements for the stabilization of the wavelengths of the individual carrier signals or the sources of laser light generating them.

In order to compensate for changes of wavelength of the carrier signals due to variations of the temperature of the surroundings or the alteration of the source of laser light, various adjustments of wavelength or of frequency have become known.

From the article "16-channel Optical FDM Distribution Transmission Experiment Utilizing Multichannel Frequency Stabilizer and Waveguide Frequency Selection Switch" by H. Toba et al., published in Electronics Letters, Apr. 27, 1989, vol. 25 No. 9, pp. 574–576, a wavelength stabilization [method] is known in which low frequency signals modulate the carrier signals by means of frequency modulation. By means of an optical ring resonator the individual carrier signals are regained from the total optical signal. The regulation of wavelengths for the individual carrier signals occurs through analysis of the frequency shift of the carrier signal due to modulation applied by the low frequency signals. The regulation of the wavelength for the individual carrier signals occurs through analysis of the frequency shift of the carrier signal caused by the modulation applied by low-frequency signals to the carrier signal. To this end the optical signal at the output of the ring resonator is transformed into an electrical signal, and the low-frequency signals contained in it are regained through demodulation.

In the article "WDM Coherent Star Network With Absolute Frequency Reference" by Y. C. Chung et al., published in Electronics Letters, Oct. 13, 1988, vol. 24 no. 21, pages 1313–1314, a wavelength stabilization [method] by means of a reference laser light source is described.

Yet the known wavelength stabilization [methods] have the disadvantage that the extraction of the regulating signals required for the wavelength stabilization of the individual optical carrier signals require a great expenditure, because additional optical components are required. For the first known wavelength stabilization [method] an optical frequency discriminator is required, and for the second known wavelength stabilization [method] a reference laser is necessary. Such optical constituent parts cause additional expenditures.

SUMMARY OF THE INVENTION

Thus it is the purpose of the invention to indicate a method and an arrangement for stabilizing the wavelengths of multi-channel optical transmission systems in which there exists for every channel a transmitter with a source of laser light which generates an optical carrier signal with a wavelength predetermined for each respective channel, in which the disadvantages of the known state of the art are avoided. Especially a wavelength regulation [method] at a reduced cost is to be made possible.

According to the invention, wavelength stabilization of the individual optical carrier signals is made possible by the fact that a certain low-frequency signal is impressed on the individual channels by means of frequency modulation and/or amplitude modulation, and that the signals of the individual channels of the optical transmission system are combined by means of a wavelength selective optical multiplexer into a total optical signal. In order to impress the low frequency signal on the optical carrier signal, the laser injection current is slightly modulated (<1%). By changing the injection current there originates a frequency modulation as well as an amplitude modulation of the optical carrier signal. Both kinds of modulation can be analyzed for the regulation of the wavelength stabilization. For the analysis the total optical signal is transformed into an electrical signal, and the low frequency signals of the individual channels are regained. By analysis of the amplitudes of the individual low-frequency signals, wavelength stabilization of the individual carrier signals is possible.

Through the use of a wavelength selective optical multiplexer, which is normally used in multichannel optical transmission systems having a large number of channels for forming the total optical signal, a modification of the amplitude of the optical carrier signal for the channels results, for those carrier signals showing a deviation from the desired wavelength. A condition for this is the use of wavelength selective multiplexers with an absolute maximum or a local minimum in the channel midpoint, such as e.g. with phased arrays. By the amplitude modulation of the individual carrier signals with various low frequency signals moreover, a low frequency electrical analysis of the change of amplitude via a wavelength deviation is possible, which also has an effect on the low-frequency signals.

The advantage of the invention consists especially in the fact that for the realization of the wavelength stabilization no expensive and high-priced optical components such as frequency discriminators or reference lasers are needed. In addition, through the use of low frequency signals for the determination of the frequency deviation of the optical signals a simple electrical analysis is made possible.

BRIEF DESCRIPTION OF THE DRAWING

Further advantages of the invention follow from the dependent claims and from the following description, based on diagrams. There are shown in:

DETAILED DESCRIPTION OF THE INVENTION

The figures represent only the component parts necessary for the understanding of the optical transmission system. Especially lacking are component parts of the transmitter necessary for the signal processing, as well as the receivers at the end of the transmission line of the optical transmission system. Optical signal lines are shown as heavy lines, and electrical signal lines by means of thin lines.

Figure 1:
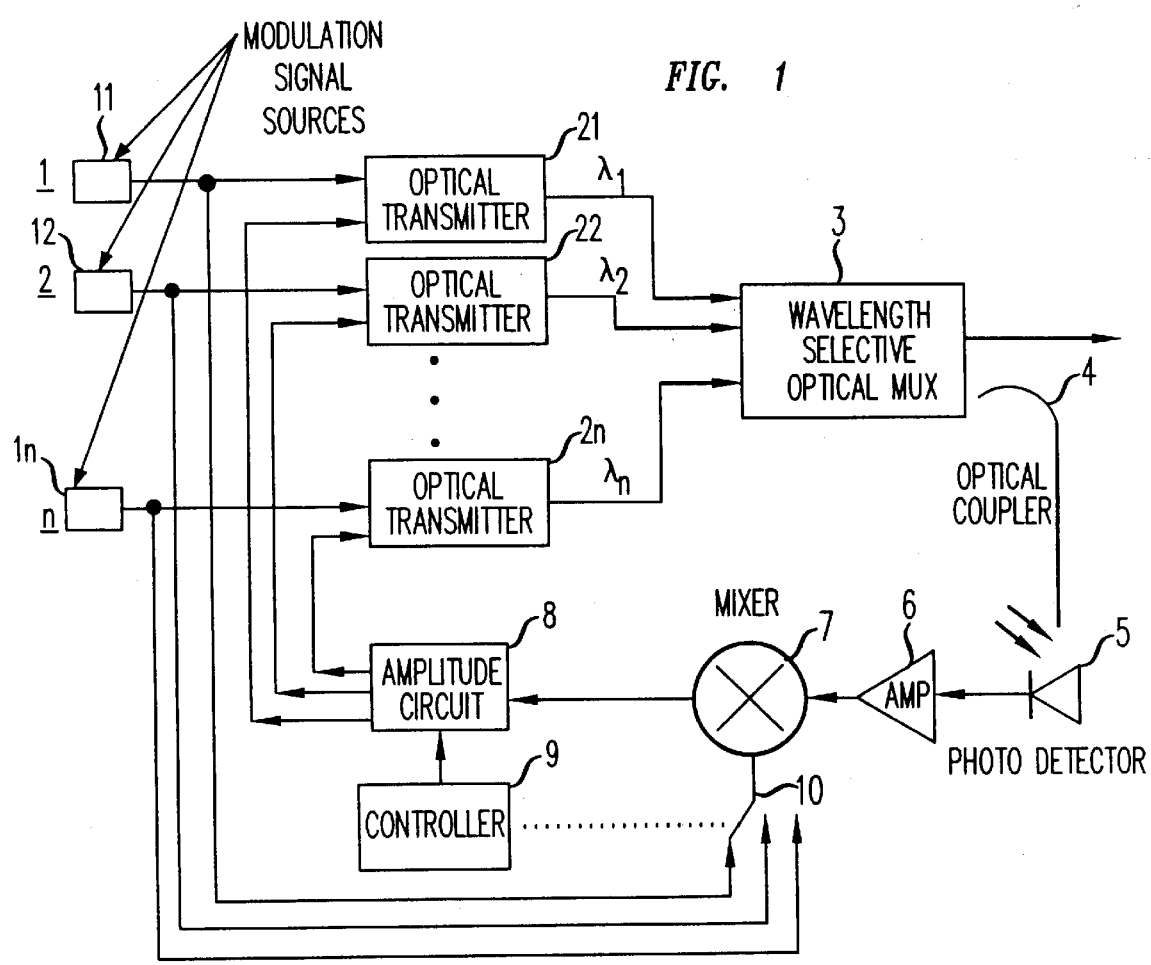
FIG. 1 is a block diagram of an arrangement according to the invention for wavelength stabilization for a multichannel optical transmission system.

FIG. 1 represents an optical multi-channel transmission system with channels 1 to n. As to detail, there are extant three devices 11 to 1n for the generation of low frequency signals, three optical transmitters 21 to 2n, a wavelength selective optical multiplexer 3, an optical coupler 4, a photodetector 5, an amplifier 6, a mixer 7, a device for determining an amplitude 8, a control device 9, and a switch 10. Each channel 1 to n is formed by one respective device 11 to 1n, and one respective transmitter 21 to 2n.

The transmitters 21 to 2n each contain a laser light source, e.g. a laser diode, which generates optical carrier signals with specific wavelengths $\lambda_1$ to $\lambda_n$. The optical carrier signals $\lambda_1$ to $\lambda_n$, onto which in the transmitters 21 to 2n the information to be transmitted is modulated, are combined by the wavelength selective optical multiplexer 3, which can, for example, be constituted of a phased array, into an optical total signal and fed into the optical fiber used for the transmission. The optical total signal passes through the optical coupler 4 which decouples a part of the signal energy of the total optical signal, and is conducted on to the photodetector 5, which can be formed, for example, of a photodiode. In the photodetector 5 the optical total signal is transformed into an electrical total signal, which is used to regulate the wavelength stabilization.

Figure 2:
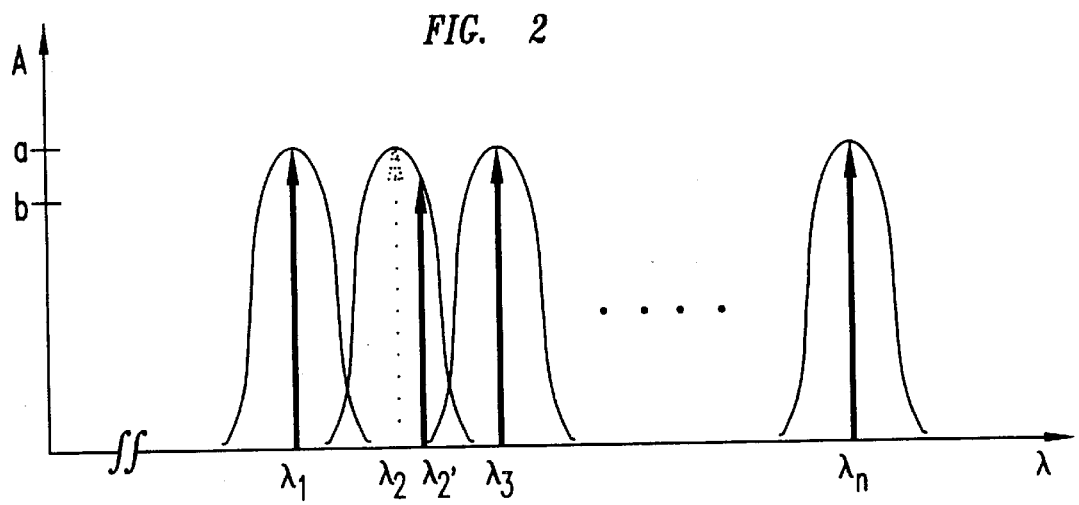
FIG. 2 is the transmission characteristics of a wavelength-selective multiplexer.

Due to the change of wavelength of one or several optical carrier signals, as shown in FIG. 2 for the carrier signal $\lambda_2$, the wavelength of which shows a deviation of $\lambda_{2'}$, the amplitude A of the carrier signal $\lambda_2$ decreases from the desired value a toward a lower value b. The reduction of the amplitude is caused by the filter effect of the wavelength selective optical multiplexer 3. Due to the reduction of the amplitude, also the power of the optical total signal, and thereby also of the total electric signal decreases. Since after the optical coupler 4 or the photo-detector 5 only the total signal is available, the determinable power change of the total signal can, however, not be applied for the regulation of the wavelength stabilization of the individual optical carrier signals.

To obtain a value which makes possible information on the wavelengths of the individual optical carrier signals contained in the total optical signal, a low frequency signal is modulated through frequency and/or amplitude modulation onto the individual optical carrier signals at their generation by means of the laser diodes contained in the transmitters 21 to 2n. For that purpose the devices 11 to 1n are provided, which can, for example, be formed of resonant circuits, in order to create low frequency electric signals, which differ for each channel 1 to n, or each optical carrier frequency. The low frequency signals can be used e.g. for the modulation of the bias current of the laser diodes, whereby the desired frequency and/or amplitude modulation of the optical carrier signal with the low frequency signals is obtained. The described low frequency signals are, correspondingly, also contained in the total electrical signal, which is generated by the photo diode 5.

For further processing of the electrical total signal originating from the photodiode, this is amplified by the amplifier 6 and conducted to a mixer 7. The low frequency signals of the devices 11 to 1n are applied to the second input of the mixer 7, controlled by the control device 9, which can comprise, for example, a clock generator, via the switch 10. By mixing the total electrical signal with the low frequency signals, the amplitude modulated low frequency signals contained in the total electrical signal are filtered out, or demodulated, according to the selected channel 1 to n. The corresponding low frequency signal is conducted to the device for determining an amplitude 8, which can be formed, for example, of a sample and hold element. The device 8 is controlled for synchronization by the control device 9, as is the switch 10. By this it is made certain that the amplitude values of the demodulated low frequency signals, determined by the device 8, which are conducted to the optical transmitters 21 to 2n, are respectively assigned to the appropriate channels 1 to n.

The thus determined amplitude values are used in the transmitters to carry out the necessary control for wavelength stabilization. To that end it is possible to carry out, for example, a wavelength stabilization of the light generated by the laser diode by modifying the temperature of the laser diode. This makes possible an electrical signal processing which can operate at a low frequency.

In the first execution of the described wavelength stabilization it is provided that upon the discovery of a deviation of an amplitude value of the low frequency signals determined from the electrical total signal, first a control of the wavelength in any direction can occur. It is, for instance, possible to carry out first an amplification of the wavelength of the corresponding optical carrier signal. If the deviation of the determined amplitude value decreases, the control process is continued until the required amplitude, and thus the required wavelength of the corresponding optical carrier signal, has been reached. If the deviation of the determined amplitude value increases, the direction of the control is changed, i.e. decrease of the wavelength is carried out until the required amplitude, and thus the required wavelength of the carrier signal concerned, has been reached.

In another form of execution it is provided that the control direction be determined, in order that, in the case of an observed deviation of the wavelength of an optical carrier signal, an adjustment in the correct direction can follow immediately. To this end it is possible to utilize the superimposed frequency modulation of the laser diode that is brought about upon amplitude modulation with the low frequency signal. This leads to a change of sign, depending on whether the wavelength of the signal at the filter edge is smaller or larger than the desired wavelength.

A further method for determining the control direction consists in determining the mean frequencies of the wavelength selective multiplexer by means of the low frequency signals via the temperature of the wavelength selective multiplexer. This leads likewise to an amplitude modulation of the demodulated signal. This depends on whether the carrier signal has been shifted toward the lower or towards the upper filter edge, i.e. whether the wavelength of the carrier signal is smaller or greater than the ideal wavelength.

For the determination of the control direction it is also possible to use higher order spectral portions of the low frequency signals which originate through the changes of wavelength of the optical carrier signal.

In place of providing a control device 9 and a switch 10, which serve for the assignment, to each channel 1 to n, of amplitude values of the low frequency signals contained in the combined signal, it is also possible to provide devices 8 and mixers 7 for each channel. Then one of the low frequency signals 11 to 1n will be directly connected to each mixer.

The invention claimed is:

1. A method of wavelength stabilization for multichannel optical transmission systems, in which for each channel of a plurality of channels there is a transmitter with a source of laser light which produces an optical carrier signal with a wavelength predetermined for each respective channel, comprising the steps of:

> modulating the optical carrier signal of each channel with a modulation signal to produce a plurality of modulated optical carrier signals, where the modulation signal has a modulation frequency which is predetermined for each channel;
>
> combining the plurality of modulated optical carrier signals using a wavelength selective multiplexer to produce an optical total signal;
>
> converting at least part of the optical total signal into an electrical total signal;
>
> mixing the electrical total signal with the modulation frequencies that are predetermined for each of the channels, the modulation frequencies being directly input to the mixer;
>
> determining an amplitude of the signal based on the output of said mixing step; and
>
> controlling a wavelength of the channel to be stabilized using the amplitude.

2. The method of claim 1, wherein the step of controlling comprises changing the wavelength to maximize the amplitude.

3. The method of claim 1, wherein the step of modulating comprises amplitude modulation.

4. A wavelength stabilization arrangement for multichannel optical transmission systems, in which for each channel of a plurality of channels there is a transmitter with a source of laser light which produces an optical carrier signal with a wavelength predetermined for each respective channel, comprising:

> a plurality of modulators, where each modulator modulates an optical carrier signal of a channel belonging to the plurality of channels with a modulation signal to produce a modulated optical carrier signal, where the modulation signal has a modulation frequency which is predetermined for each channel;
>
> a wavelength selective multiplexer that combines a plurality of modulated optical carrier signals to produce an optical total signal;
>
> a photo detector that converts at least part of the optical total signal into an electrical total signal;
>
> a mixer that mixes the electrical total signal with the modulation frequencies that are predetermined for each of the channels, the modulation frequencies being directly input to the mixer;
>
> an amplitude circuit that determines an amplitude of the signal based on amplitude modulated low frequency signals that have been filtered out in the mixer; and
>
> a controller that produces a signal to change a wavelength of the channel to be stabilized using the amplitude.

5. The wavelength stabilization arrangement of claim 4, wherein the filter is a mixer.

6. The wavelength stabilization arrangement of claim 4, wherein the plurality of modulators are amplitude modulators.

7. The wavelength stabilization arrangement of claim 4, wherein the plurality of modulators are frequency modulators.

* * * * *